United States Patent [19]

Shekleton et al.

[11] Patent Number: 5,207,055
[45] Date of Patent: May 4, 1993

[54] VOLUME ENHANCED TURBINE ENGINE COMBUSTION ZONE

[75] Inventors: Jack R. Shekleton; Colin Rodgers, both of San Diego, Calif.

[73] Assignee: Sundstrand Corporation, Rockford, Ill.

[21] Appl. No.: 956,173

[22] Filed: Oct. 5, 1992

Related U.S. Application Data

[62] Division of Ser. No. 615,048, Nov. 19, 1990, Pat. No. 5,172,546.

[51] Int. Cl.$^5$ .............................................. F02C 7/00
[52] U.S. Cl. .................................... 60/39.360; 60/741
[58] Field of Search ................... 60/39.36, 39.75, 752, 60/760, 741

[56] References Cited

U.S. PATENT DOCUMENTS

| | | | |
|---|---|---|---|
| 3,116,908 | 1/1964 | Wosika | 60/39.36 |
| 3,613,360 | 1/1971 | Howes | 60/39.36 |
| 3,937,013 | 2/1976 | Aspinwall | 60/39.36 |
| 4,766,722 | 8/1988 | Bayle-Laboure et al. | 60/752 |
| 4,825,640 | 5/1989 | Shekleton | 60/39.36 |
| 4,991,390 | 2/1991 | Shah | 60/760 |
| 5,111,655 | 5/1992 | Shekleton | 60/39.36 |
| 5,163,284 | 11/1992 | Shekleton | 60/760 |

*Primary Examiner*—Richard A. Bertsch
*Assistant Examiner*—Timothy S. Thorpe
*Attorney, Agent, or Firm*—Wood, Phillips, VanSanten, Hoffman & Ertel

[57] ABSTRACT

In order to establish a larger dome height to thereby increase combustion volume within the same turbine engine envelope, the inner wall region of an annular combustor is formed to define a thrust nozzle which in turn provides an enhanced combustion zone. The turbine engine will include a rotary compressor and a turbine wheel coupled to the rotary compressor for driven movement thereof along with an annular nozzle proximate the turbine wheel for directing gases of combustion thereat. The annular combustor will be disposed about the turbine wheel and defined by a radially extending wall region connecting the inner wall region to an outer wall region such that the annular combustor has a combustion zone upstream of the annular nozzle and a dilution air zone intermediate the annular nozzle and the combustion zone. The turbine engine will operate such that the annular combustor combusts fuel from a fuel source and air from the rotary compressor to generate the gases of combustion which are directed at the turbine wheel by the annular nozzle for driven movement of the turbine wheel and the rotary compressor. By reason of the thrust nozzle being axially adjacent the turbine wheel and radially inwardly of the annular combustor, the turbine engine has a generally annular expanded combustion zone relative to the dilution zone within the same turbine engine envelope.

14 Claims, 2 Drawing Sheets

VOLUME ENHANCED TURBINE ENGINE COMBUSTION ZONE

This is a division of application Ser. No. 07/615,048 filed Nov. 19, 1990, now U.S. Pat. No. 5,172,546

FIELD OF THE INVENTION

The present invention is generally directed to a turbine engine and, more particularly, a turbine engine having a combustion zone with an enhanced volume.

BACKGROUND OF THE INVENTION

For most large turbine engine applications, there are certainly some constraints on engine diameter as it relates to the impact on combustor performance. But the combustion volume is usually quite sufficient to accommodate the overall performance objectives for a particular application. As a result, the turbine engine can in most cases be designed to provide the volume for combustion that is required to achieve the desired performance objectives.

On the other hand, it is quite well known that small thrust turbine engines present a myriad of rather serious design problems. Almost always, there are restrictions on overall engine diameter which, in turn, has a significant impact on achieving performance goals inasmuch as the dome height of a given combustor is usually tied very directly to engine diameter. Because of this limitation, the dome height has often been much less than satisfactory and combustor loadings are often much greater than desired.

Generally speaking, the dome height is determined by the difference between the radius of the engine and the radius of the exhaust duct. The exhaust duct, which typically extends between the turbine wheel and the turbine nozzle located axially downstream of the combustor, is usually of substantially uniform diameter corresponding rather directly to the diameter of the turbine wheel at the point where the gases of combustion exit the turbine wheel en route to the turbine nozzle. Because of this arrangement, the dome height cannot be varied to any significant degree to achieve an increased combustion volume.

As a result, the only other possibility for increasing combustion volume is increasing combustor length. However, this may also be undesirable for a number of reasons including space availability for the turbine engine and the impact of such relative length in relation to dome height on overall performance. For these reasons, there has been a significant awareness of the need to increase the combustion volume in the constraints of the same engine envelope.

The present invention is directed to overcoming one or more of the foregoing problems and achieving one or more of the resulting objects.

SUMMARY OF THE INVENTION

It is a principal object of the present invention to provide an improved turbine engine which is configured to have an enhanced combustion zone. It is also an object of the present invention to provide a turbine engine wherein combustion volume is increased while maintaining a given engine envelope. It is a further object of the present invention to provide an enhanced combustion zone by locating a thrust nozzle radially inwardly of the combustor.

Accordingly, the present invention is directed to a turbine engine having a rotary compressor, a turbine wheel coupled to the rotary compressor for driven movement thereof, and an annular nozzle proximate the turbine wheel for directing gases of combustion thereat. The turbine engine also includes an annular combustor about the turbine wheel defined by spaced inner and outer wall regions connected by a radially extending wall region. The annular combustor has a combustion zone upstream of the annular nozzle and a dilution air zone intermediate the annular nozzle and the combustion zone. The turbine engine also includes means for injecting air from the rotary compressor and fuel from a source into the annular combustor. The annular combustor is adapted to combust fuel from the fuel source and air from the rotary compressor to generate the gases of combustion. The turbine engine operates by reason of the gases of combustion being directed at the turbine wheel by the annular nozzle for driven movement of the turbine wheel and the rotary compressor. With this arrangement, the inner wall region of the annular combustor is configured to form a thrust nozzle axially adjacent the turbine wheel and radially inwardly of the annular combustor.

In an exemplary embodiment, the thrust nozzle includes a radially expanded region immediately adjacent the turbine wheel and a radially restricted region just downstream of the radially expanded region. More specifically, the thrust nozzle includes a radially expanded region radially inwardly of the dilution air zone and a radially restricted region radially inwardly of the combustion zone. Still more specifically, the thrust nozzle is formed such that the radially expanded region tapers from a first diameter at the turbine wheel to a second, smaller diameter adjacent the radially restricted region. With this arrangement, the thrust nozzle may be formed with the radially restricted region having a substantially uniform diameter and the combustion zone thereby comprising a generally annular expanded space relative to the dilution air zone.

In one specific embodiment, the turbine engine includes an annular combustor housing surrounding the annular combustor in generally concentric radially spaced relation to inner and outer walls. The annular combustor housing is also in axially spaced relation to the radially extending wall. With this arrangement, the annular combustor housing and annular combustor define an air flow path from the rotary compressor substantially entirely about the annular combustor.

In another specific embodiment, the annular combustor housing surrounds only the outer and radially extending walls. The inner wall in this embodiment thus directly separates the annular combustor and thrust nozzle, i.e., it forms a common wall for both the annular combustor and thrust nozzle. In this embodiment, the air flow path extends about the annular combustor only along the outer and radially extending walls.

Preferably, the annular combustor will have a plurality of air film cooling passages at least in the last mentioned embodiment. These cooling passages may be adapted to direct air along an inner surface of the radially extending wall and/or an inner surface of the inner wall of the annular combustor. In either case, a deflector plate may be advantageously positioned adjacent each of the air film cooling passages for directing air thereby.

Other objects, advantages and features of the present invention will become apparent from a consideration of

DETAILED DESCRIPTION OF THE PREFERRED EMBODIMENTS

Figure 1:
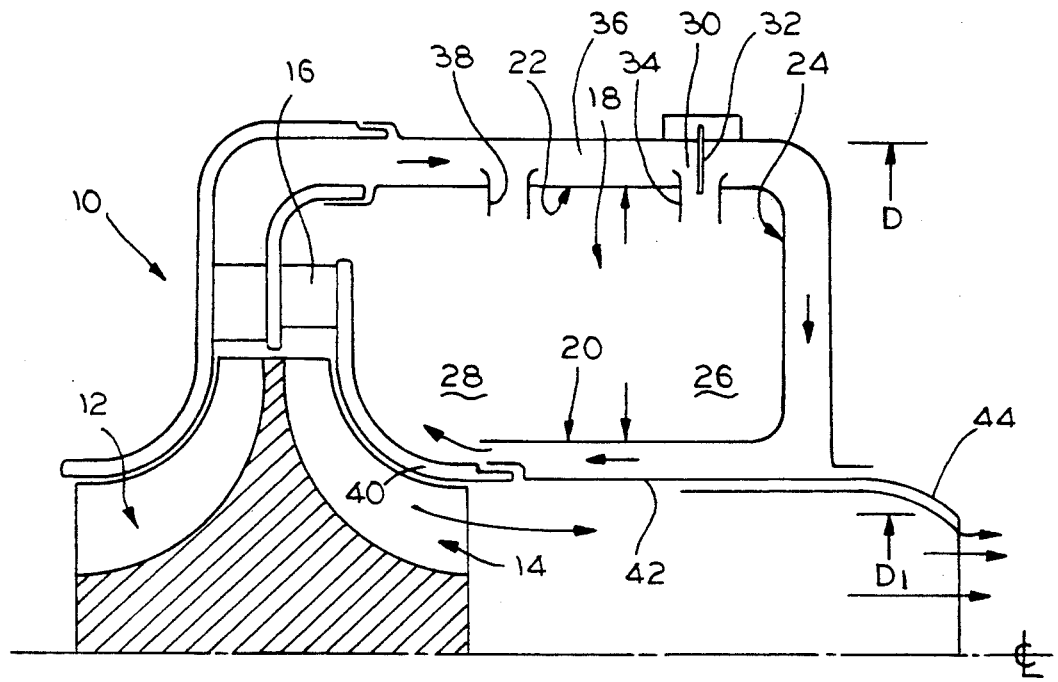
FIG. 1 is a cross-sectional view of a turbine engine in accordance with the prior art.

Referring to the drawings, and first to FIG. 1, the reference numeral 10 designates generally a turbine engine in accordance with the prior art. It will be appreciated, of course, that the turbine engine 10 has certain aspects in common with the embodiments of the turbine engine in accordance with the present invention that have been illustrated in FIGS. 2 through 4. As a result, the components will be deemed to be common in all embodiments unless specifically noted to the contrary herein.

Referring to FIG. 1, the turbine engine 10 includes a rotary compressor 12 and a turbine wheel 14 coupled to the rotary compressor 12 for driven movement thereof. An annular nozzle 16 is located proximate the turbine wheel 14 for directing gases of combustion at the turbine wheel 14. As will be appreciated, the turbine engine 10 has an annular combustor 18 which is disposed about the turbine wheel 14 substantially as illustrated.

Still referring to FIG. 1, the annular combustor 18 is defined by spaced inner and outer wall regions 20 and 22 connected by a radially extending wall region 24. The annular combustor 18 has a combustion zone 26 upstream of the annular nozzle 16 and a dilution air zone 28 intermediate the annular nozzle 16 and the combustion zone 26. The annular combustor 18 is adapted to combust fuel from a fuel source and air from the rotary compressor 12 to generate gases of combustion utilized in operation of the turbine engine 10. More specifically, the gases of combustion are directed at the turbine wheel 14 by the annular nozzle 16 for driven movement of the turbine wheel 14 and the rotary compressor 12.

Typically, the turbine engine 10 will include suitable means for injecting fuel from the fuel source into the annular combustor 18 as well as means for injecting air from the rotary compressor into the annular combustor 18. The fuel injection means may by way of example take the form of a plurality of air pressure atomization fuel injectors 30 associated with the outer wall region 22, or any of a wide variety of other ways known in the art. In the embodiment as illustrated, the fuel injectors 30 each include a fuel supply tube 32 extending into an air tube 34 in communication with an air flow path 36 leading from the rotary compressor 12.

Also as shown, the turbine engine 10 may typically include a plurality of dilution air nozzles 38 which are associated with the outer wall region 22 of the annular combustor 18. These, too, are in communication with the air flow path 36 and serve to direct dilution air into the dilution air zone 28 at a point downstream of the combustion zone 26. Still further, the turbine engine 10 may typically include a dilution air outlet 40 at the end of the air flow path 36 remote from the rotary compressor 12 for directing air generally toward the annular nozzle 16.

Figure 2:
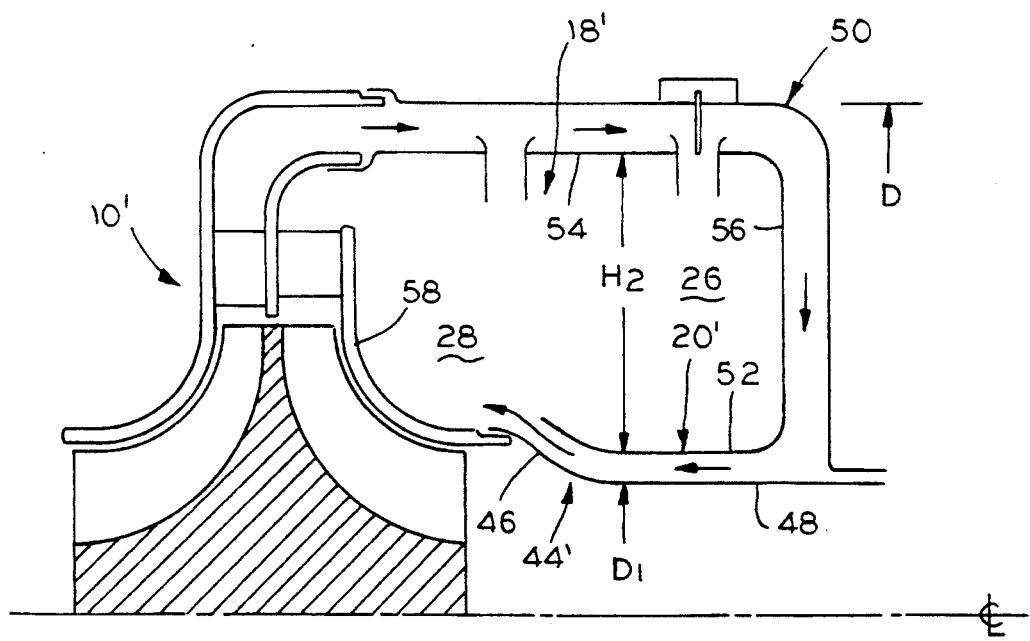
FIG. 2 is a cross-sectional view of a first embodiment of turbine engine in accordance with the present invention.

As for the foregoing, it will be appreciated that each of the components is common to the embodiments as illustrated in FIGS. 1 and 2. Thus, the turbine engine 10' illustrated in FIG. 2 need not be described in detail as to the components already described in connection with the turbine engine 10 of FIG. 1, although it should be noted that modified and/or relocated components have been designated by prime numbers hereinafter. In addition, by comparing FIGS. 1 and 2, it will be appreciated that the turbine engines 10 and 10' do differ in a most important respect.

Specifically, the turbine engine 10 has a conventional exhaust duct 42 leading from the turbine wheel 14 to a point axially well beyond the radially extending wall region 24. It will be seen that the exhaust duct 42 leads to and is integral with a thrust nozzle 44. As clearly shown in FIG. 1, the thrust nozzle 44 is located at a point axially well downstream of the radially extending wall region 24.

In contrast, the turbine engine 10' eliminates the exhaust duct 42 in favor of a thrust nozzle 44' substantially as shown in FIG. 2.

In essence, the turbine engine 10' is such that the inner wall region 20 of the annular combustor 18' defines the thrust nozzle 44'. The thrust nozzle 44' is thus located axially adjacent the turbine wheel 14 and radially inwardly of the annular combustor 18'. In addition, the thrust nozzle 44' is disposed at a point well upstream of the radially extending wall portion 24.

Still referring to FIG. 2, the thrust nozzle 44' includes a radially expanded region 46 immediately adjacent the turbine wheel 14 and a radially restricted region 48 just downstream of the radially expanded region 46. The radially expanded region 46 is disposed radially inwardly of the dilution air zone 28 and the radially restricted region 48 is disposed radially inwardly of the combustion zone 26' with the radially restricted region 48 having a substantially uniform diameter and the combustion zone 26' comprising a generally annular expanded space or volume relative to the dilution zone 28. As will be appreciated, the thrust nozzle 44' is formed such that the radially expanded region 46 tapers from a first diameter at the turbine wheel 14 to a second, smaller diameter adjacent the radially restricted region 48.

As shown in FIG. 2, the turbine engine 10' includes an annular combustor housing 50 surrounding the annular combustor 18'. It will be seen that the annular combustor housing 50 is in generally concentric radially spaced relation to the inner and outer walls 52 and 54 and in axially spaced relation to the radially extending wall 56 to thereby define the air flow path 36. In this connection, the air flow path 36 extends from the rotary compressor 12 substantially entirely about the annular combustor 18'.

As will be appreciated, the turbine engines 10 and 10' operate in a very similar fashion although their performance characteristics are quite different due to the enhanced combustion zone 26'. The key difference is thus providing a thrust nozzle 44' of the type described hereinabove which is axially adjacent the turbine nozzle 14 and radially inwardly of the annular combustor 18' at a point upstream of the radially extending wall 56 whereby the combustion zone 26' is significantly enlarged in terms of combustion volume within the same engine envelope due to the much larger dome height that occurs by positioning the radially restricted region 48 radially inwardly of the combustion zone 26'. For small thrust turbine engines 10', the additional space gained is most advantageous in providing adequate combustor performance in minimal space.

Referring specifically to FIG. 2, the air flow path 36 provides cooling air externally of the annular combustor 18'. Thus, the inner and outer walls 52 and 54 and the radially extending wall 56 are all cooled by reason of air flowing from the rotary compressor 12 along and through the air flow path 36. In addition, the dilution air outlet 40 will be understood to provide dilution air that also serves to cool the turbine shroud 58.

Figure 3:
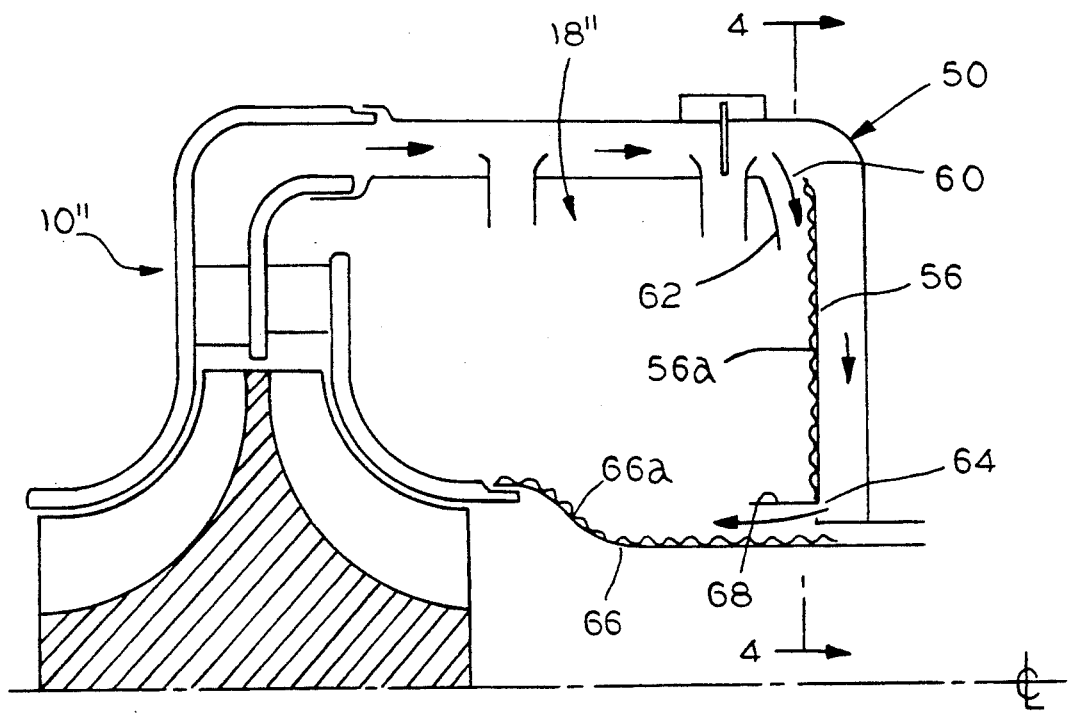
FIG. 3 is a cross-sectional view of a second embodiment of turbine engine in accordance with the present invention.
Figure 4:
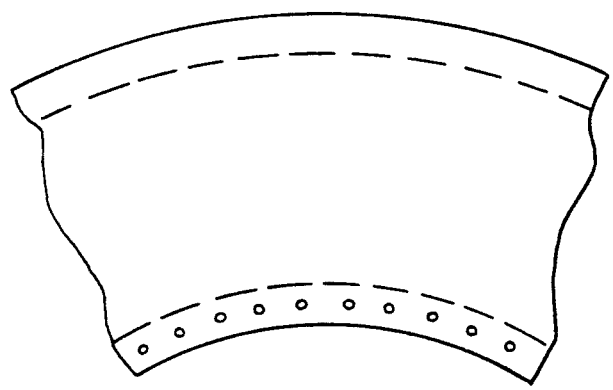
FIG. 4 is a cross-sectional view taken on the line 4—4 of FIG. 3.

Referring to FIG. 3, the turbine engine 10" includes a wide variety of features common to turbine engines 10 and 10'. It will be seen, however, that there are certain important differences including the fact that the inner wall 52 has been eliminated whereby only the portion of the annular combustor housing 50 defining the thrust nozzle 44' remains. As a result, it will be understood that the combustion volume has been still further increased within the same engine envelope.

In the embodiment illustrated in FIG. 3, the turbine engine 10" is formed such that the annular combustor 18" has a plurality of air film cooling passages 60. These air film cooling passages 60 (see, also, FIG. 4) direct air along an inner surface 56a of the radially extending wall 56. Advantageously, a deflector plate 62 is provided at a point adjacent each of the air film cooling passages 60 for appropriately directing air substantially as shown.

Still further, the turbine engine 10" will be seen to be formed such that the annular combustor 18" has a plurality of air film cooling passages 64. The air film cooling passages 64 (see, also, FIG. 4) direct air substantially along the inner surface 66a of the portion 66 of the annular combustor housing 50 that essentially comprises the inner wall of the annular combustor 18" in the embodiment illustrated in FIG. 3. In addition, a deflector plate 68 is adjacent each of the air film cooling passages 64 for directing air along the inner surface 66a for cooling purposes.

As will be appreciated from FIG. 3, the annular combustor housing 50 in the region of the inner wall of the annular combustor 18" defines the thrust nozzle 44'. This portion 66 of the annular combustor housing 50 now forms the only separation between the combustion zone 26" (enlarged still further within the same envelope in comparison with the combustion zone 26' of FIG. 2) and is cooled by air film cooling through the passages 64 in cooperation with the deflector plates 68. As before, the thrust nozzle 44' includes a radially expanded region 46 and a radially restricted region 48 well upstream of the radially extending wall 56.

Still referring to FIG. 3, the turbine engine 10" can utilize a thermal barrier coating on the radially extending wall 56 and the portion 66 of the annular housing 50. This may serve as an alternative to air film cooling or may be used in addition to air film cooling, particularly in regions adjacent to the flame as in the combustion zone 26". Also, while the deflector plates 62 and 68 are well suited for their intended purpose, it will be appreciated that they may be eliminated in order to reduce cost for certain applications.

While in the foregoing there have been set forth preferred embodiments of the invention, it will be appreciated that the details herein given may be varied by those skilled in the art without departing from the true spirit and scope of the appended claims.

We claim:

1. A turbine engine, comprising:
   a rotary compressor and a turbine wheel coupled to said rotary compressor for driven movement thereof;
   an annular nozzle proximate said turbine wheel for directing gases of combustion at said turbine wheel;
   an annular combustor about said turbine wheel defined by spaced inner and outer wall regions connected by a radially extending wall region, said annular combustor having a combustion zone upstream of said annular nozzle and a dilution air zone intermediate said annular nozzle and said combustion zone;
   means for injecting air from said rotary compressor into said annular combustor; and
   means for injecting fuel from a fuel source into said annular combustor;
   said annular combustor being adapted to combust fuel from said fuel source and air from said rotary compressor to generate said gases of combustion, said gases of combustion being directed at said turbine wheel by said annular nozzle for driven movement of said turbine wheel and said rotary compressor;
   said inner wall region of said annular combustor defining a thrust nozzle axially adjacent said turbine wheel and radially inwardly of said annular combustor said combustion zone comprising a generally annular expanded space relative to said dilution zone.

2. The turbine engine as defined by claim 1 wherein said thrust nozzle includes a radially expanded region adjacent said turbine wheel and a radially restricted region downstream of said radially expanded region.

3. The turbine engine as defined by claim 1 wherein said thrust nozzle includes a radially expanded region radially inwardly of said dilution air zone and a radially restricted region radially inwardly of said combustion zone.

4. The turbine engine as defined by claim 1 wherein said thrust nozzle includes a radially expanded region tapering from a first diameter at said turbine wheel to a second, smaller diameter comprising a radially restricted region.

5. The turbine engine as defined by claim 1 wherein said thrust nozzle includes a radially restricted region of substantially uniform diameter and said combustion zone comprises a generally annular expanded space relative to said dilution zone.

6. A turbine engine, comprising:
   a rotary compressor and a turbine wheel coupled to said rotary compressor for driven movement thereof;
   an annular nozzle proximate said turbine wheel for directing gases of combustion at said turbine wheel;
   an annular combustor about said turbine wheel defined by spaced inner and outer walls connected by a radially extending wall, said annular combustor having a combustion zone upstream of said annular nozzle and a dilution air zone intermediate said annular nozzle and said combustion zone;
   an annular combustor housing surrounding said annular combustor in generally concentric radially spaced relation to said outer wall and in axially spaced relation to said radially extending wall to define an air flow path from said rotary compressor therebetween;

means for injecting air from said air flow path into said annular combustor; and means for injecting fuel from a fuel source into said annular combustor;

said annular combustor being adapted to combust fuel from said fuel source and air from said air flow path to generate said gases of combustion, said gases of combustion being directed at said turbine wheel by said annular nozzle for driven movement of said turbine wheel and said rotary compressor;

said inner wall of said annular combustor defining a thrust nozzle axially adjacent said turbine wheel and radially inwardly of said annular combustor upstream of said radially extending wall said combustion zone comprising a generally annular expanded space relative to said dilution zone.

7. The turbine engine as defined by claim 6 wherein said thrust nozzle includes a radially expanded region adjacent said turbine wheel and a radially restricted region downstream of said radially expanded region.

8. The turbine engine as defined by claim 6 wherein said thrust nozzle includes a radially expanded region radially inwardly of said dilution air zone and a radially restricted region radially inwardly of said combustion zone.

9. The turbine engine as defined by claim 6 wherein said thrust nozzle includes a radially expanded region tapering from a first diameter at said turbine wheel to a second, smaller diameter comprising a radially restricted region.

10. The turbine engine as defined by claim 6 wherein said thrust nozzle includes a radially restricted region of substantially uniform diameter and said combustion zone comprises a generally annular expanded space relative to said dilution zone.

11. The turbine engine as defined by claim 6 wherein said annular combustor has a plurality of air film cooling passages directing air along an inner surface of said radially extending wall of said annular combustor.

12. The turbine engine as defined by claim 11 including a deflector plate adjacent each of said air film cooling passages for directing air along said inner surface of said radially extending wall of said annular combustor.

13. The turbine engine as defined by claim 6 wherein said annular combustor has a plurality of air film cooling passages directing air along an inner surface of said inner wall of said annular combustor.

14. The turbine engine as defined by claim 13 including a deflector plate adjacent each of said air film passages for directing air along said inner surface of said inner wall of said annular combustor.

* * * * *